US012748846B2

(12) United States Patent
Pozidis et al.

(10) Patent No.: US 12,748,846 B2
(45) Date of Patent: Sep. 29, 2026

(54) GROUPED RANSOMWARE DETECTION IN DATA STORAGE SYSTEMS

(71) Applicant: International Business Machines Corporation, Armonk, NY (US)

(72) Inventors: Charalampos Pozidis, Thalwil (CH); Dionysios Diamantopoulos, Zurich (CH); Roman Alexander Pletka, Uster (CH); Yves Alexandre Beraldo dos Santos, Marana, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 18/989,822

(22) Filed: Dec. 20, 2024

(65) Prior Publication Data

US 2026/0178736 A1 Jun. 25, 2026

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,557,035 B1 | 4/2003 | McKnight | |
| 8,171,414 B2 | 5/2012 | Hackworth | |
| 9,477,530 B2 | 10/2016 | Nachtrab et al. | |
| 12,058,169 B1 * | 8/2024 | Brandwine | H04L 63/1425 |
| 12,086,250 B1 * | 9/2024 | Brandwine | G06F 13/20 |
| 2003/0074528 A1 * | 4/2003 | Soejima | G06F 3/0631 711/114 |
| 2017/0038992 A1 * | 2/2017 | Levy | G06F 3/0604 |
| 2018/0357133 A1 * | 12/2018 | Strogov | G06F 11/1451 |
| 2019/0251259 A1 * | 8/2019 | Stepanek | G06F 21/554 |

(Continued)

FOREIGN PATENT DOCUMENTS

| | | |
|---|---|---|
| JP | 2003-296039 A | 10/2003 |
| WO | 2024/255259 A1 | 12/2024 |

OTHER PUBLICATIONS

G. Slavova-Torres, "Entropy-Aware AI-Powered Ransomware Detection Using IBM FlashCore Module 4 in SAN Environments," 2025 International Conference Automatics and Informatics (ICAI), Varna, Bulgaria, 2025, pp. 100-106, (Year: 2025).*

(Continued)

*Primary Examiner* — Jeffery L Williams
(74) *Attorney, Agent, or Firm* — Edward J. Wixted, III

(57) ABSTRACT

A method, in one approach, includes: representing a set of volumes in a storage system as vectors of characteristics in a multi-dimensional vector space. The vectors are used to identify subsets of the volumes having similar characteristics. Moreover, the subsets of volumes are clustered into respective common groups of volumes. The common groups of volumes are further identified in the multi-dimensional vector space. The method also includes tracking, in the multi-dimensional vector space, the similar characteristics of the respective common groups of volumes. Furthermore, ransomware detection is performed on the common groups of volumes.

20 Claims, 7 Drawing Sheets

(56) References Cited

U.S. PATENT DOCUMENTS

| | | | | |
|---|---|---|---|---|
| 2020/0250522 | A1* | 8/2020 | Meiri | G06N 3/08 |
| 2022/0027472 | A1 | 1/2022 | Golden et al. | |
| 2022/0318629 | A1* | 10/2022 | Meiri | G06N 3/08 |
| 2023/0289443 | A1 | 9/2023 | Sinha et al. | |
| 2024/0095358 | A1* | 3/2024 | Zhang | G06F 21/554 |
| 2025/0068734 | A1* | 2/2025 | Pletka | G06F 21/564 |
| 2025/0284803 | A1* | 9/2025 | Pletka | G06F 21/565 |
| 2026/0099597 | A1* | 4/2026 | Diamantopoulos | G06F 21/56 |
| 2026/0127075 | A1* | 5/2026 | Park | G06F 11/1423 |
| 2026/0127280 | A1* | 5/2026 | Pletka | G06F 21/56 |
| 2026/0178736 | A1* | 6/2026 | Pozidis | G06F 21/566 |

OTHER PUBLICATIONS

Institute of Electrical and Electronics. 2000. The Authoritative Dictionary of IEEE Standards Terms (7th. ed.). IEEE Computer Society Press, Washington, DC, USA. (Year: 2000).*

Microsoft Press. 2002. Microsoft Computer Dictionary, Fifth Edition (5th. ed.). Microsoft Press, USA. (Year: 2002).*

George McDaniel. 1994. IBM dictionary of computing. McGraw-Hill, Inc., USA. (Year: 1994).*

Michael Argene, Clara Ravenscroft, Ivy Kingswell. Ransomware Detection via Cosine Similarity-Based Machine Learning on Bytecode Representations. Authorea. Aug. 12, 2024. (Year: 2024).*

Mehmet Ozturk, Baran Yilmaz, Zeynep Arslan et al. An Effective Strategy for Ransomware Mitigation on Android Devices via Android OS File System API, Apr. 23, 2024, Preprint (Version 1) available at Research Square [https://doi.org/10.21203/rs.3.rs-4299415/v1] (Year: 2024).*

Dionysios Diamantopoulos et al. 2024. WannaLaugh: A Configurable Ransomware Emulator—Learning to Mimic Malicious Storage Traces. In Proceedings of the 17th ACM International Systems and Storage Conference (SYSTOR '24). Association for Computing Machinery, New York, NY, USA, 118-131. (Year: 2024).*

IBM.com, "Volumes", IBM Storage Virtualize for Public Cloud, Mar. 30, 2023, www.ibm.com/docs/en/svfpc/8.5.z/topic=overview-volumes; p. 1-7, accessed Jun. 25, 2026. (Year: 2023).*

M. Hirano and R. Kobayashi, "Machine Learning Based Ransomware Detection Using Storage Access Patterns Obtained From Live-forensic Hypervisor," 2019 Sixth International Conference on Internet of Things: Systems, Management and Security (IOTSMS), Granada, Spain, 2019, pp. 1-6, (Year: 2019).*

Gagulic et al., "Ransomware Detection with Machine Learning in Storage Systems", University of Zurich Department of Informatics, Feb. 13, 2023, p. 1-114. (Year: 2023).*

Hirano, Manabu & Hodota, Ryo & Kobayashi, Ryotaro. (2022). RanSAP: An open dataset of ransomware storage access patterns for training machine learning models. Forensic Science International: Digital Investigation. 40. 301314. 10.1016/j.fsidi.2021.301314. (Year: 2022).*

Hirano, Manabu & Tsuzuki, Takuma & Ikeda, Seishiro & Taka, Naoga & Fujiwara, Kenji & Kobayashi, Ryotaro. (2017). WaybackVisor: Hypervisor-Based Scalable Live Forensic Architecture for Timeline Analysis. 10.1007/978-3-319-72395-2_21. (Year: 2017).*

Greenfield et al. IBM FlashSystem Safeguarded Copy Implementation Guide, IBM, Mar. 2022, 62 pages.

International Searching Authority, "Notification of Transmittal of the International Search Report and the Written Opinion of the International Searching Authority, or Declaration," Patent Cooperation Treaty, Feb. 20, 2026, 09 pages, International Application No.-PCT/EP2025/085667.

* cited by examiner

GROUPED RANSOMWARE DETECTION IN DATA STORAGE SYSTEMS

BACKGROUND

The present invention relates to data storage systems, and more specifically, this invention relates to detecting ransomware activity in data storage systems.

The prevalence of computer systems has increased with the advancement of the Internet, and wireless network standards such as Bluetooth and Wi-Fi. Additionally, the adoption and development of smart devices, e.g., such as smartphones, televisions, tablets, and other devices in the Internet of Things (IoT) has increased as processing power and functionality improve.

Moreover, an increasing amount of physical material has been digitized. While this digital conversion improves data storage and data accessibility, it also increases the importance of maintaining cybersecurity (e.g., computer security). Cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc.

While some platforms have been developed to protect computer systems and networks from such attacks, threats are consistently evolving. Computer systems and networks thereby face various types of attacks over time. Ransomware is one such type of cybersecurity attack that has been difficult for conventional products to detect and overcome. Accordingly, there exists a need to develop an intelligent system that is able to detect ransomware activity.

SUMMARY

A method, in one approach, includes: representing a set of volumes in a storage system as vectors of characteristics in a multi-dimensional vector space. The vectors are used to identify subsets of the volumes having similar characteristics. Moreover, the subsets of volumes are clustered into respective common groups of volumes. The common groups of volumes are further identified in the multi-dimensional vector space. The method also includes tracking, in the multi-dimensional vector space, the similar characteristics of the respective common groups of volumes. Furthermore, ransomware detection is performed on the common groups of volumes.

A computer program product, in one approach, includes: one or more computer-readable storage media. The computer program product also includes program instructions that are stored on the one or more storage media to perform any combination of the foregoing methodologies.

A computer system, in yet another approach, includes: a processor set, and one or more computer-readable storage media. The computer system also includes program instructions that are stored on the one or more storage media to cause the processor set to perform any combination of the foregoing methodologies.

Other aspects and implementations of the present invention will become apparent from the following detailed description, which, when taken in conjunction with the drawings, illustrate by way of example the principles of the invention.

DETAILED DESCRIPTION

Figure 1:
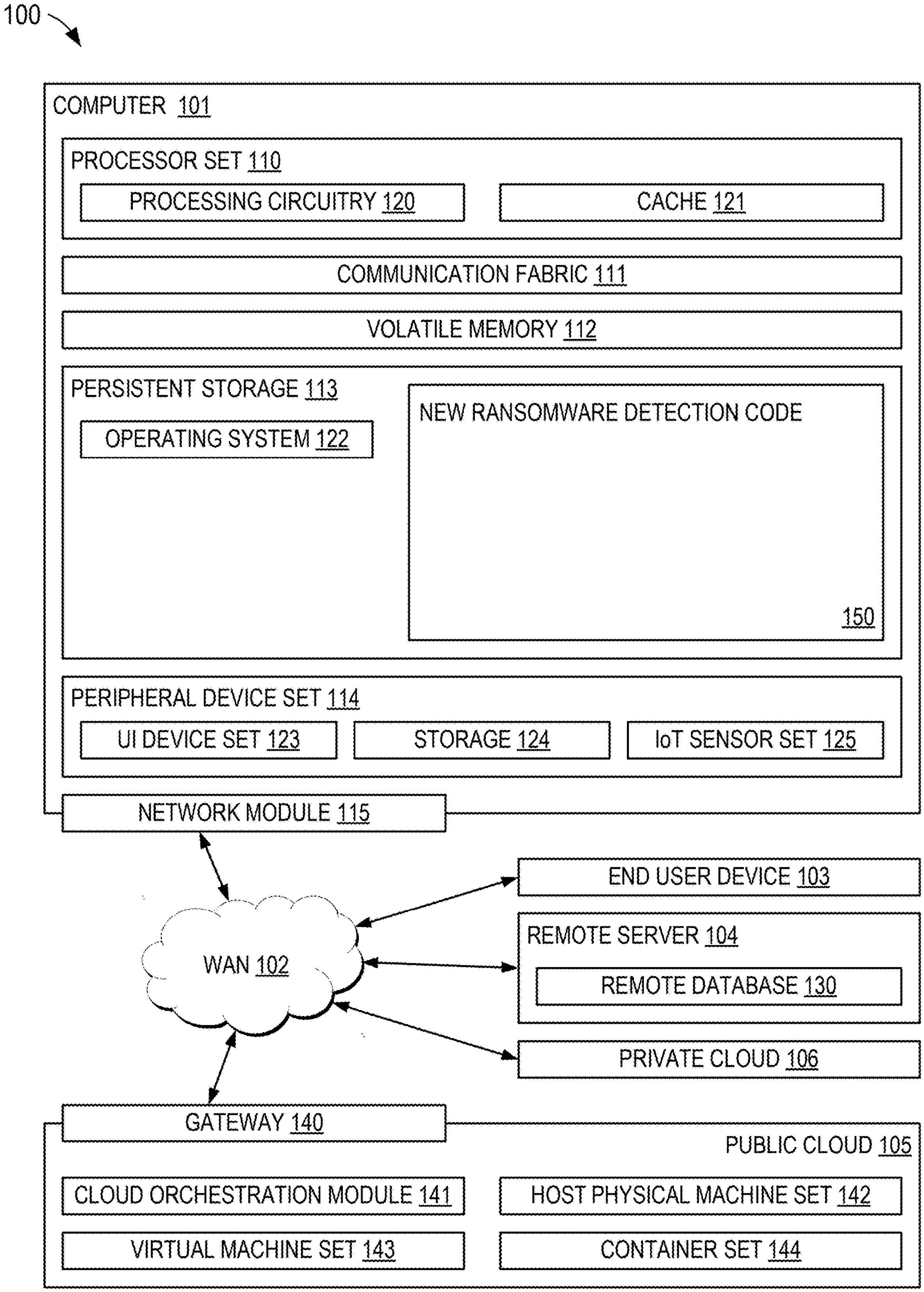
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for improving the efficiency with which ransomware activity is detected in storage systems. Approaches herein involve identifying similar data in memory and grouping the similar data into subsets that are evaluated independently. Evaluating groups of similar data as opposed to each datapoint individually desirably reduces the computational overhead and latency experienced while performing ransomware detection in a storage system. Moreover, similar data may be identified based on characteristics (e.g., statistics, performance metrics, location information, etc.) that are collected from the data at a fine granular level. These characteristics are desirably collected in parallel and in real-time at high speeds, allowing for approaches herein to maintain an accurate and updated understanding of the data that is stored in memory. This allows for ransomware to be identified at the same speed that data inputs/outputs (I/Os) are received and processed by a system, e.g., as will be described in further detail below.

In one general approach, a method includes: representing a set of volumes in a storage system as vectors of characteristics in a multi-dimensional vector space. The vectors are used to identify subsets of the volumes having similar characteristics. Moreover, the subsets of volumes are clustered into respective common groups of volumes. The common groups of volumes are further identified in the multi-dimensional vector space. The method also includes tracking, in the multi-dimensional vector space, the similar characteristics of the respective common groups of volumes. Furthermore, ransomware detection is performed on the common groups of volumes.

Approaches herein are thereby desirably able to detect ransomware activity in storage systems while experiencing less compute overhead. This is achieved at least in part by evaluating subsets of sufficiently similar data together. For instance, the characteristics of the data (also referred to herein as "features") may further be merged into multi-dimensional vectors which correspond to the respective portions of data in memory from which they were extracted. Approaches herein are thereby able to implement collections of characteristics at a fine granular level that outlines the data stored across the storage devices themselves.

In some implementations, the method further includes analyzing current characteristics of the volumes in the respective common groups of volumes. In response to determining a first volume in a first of the common groups of volumes has current characteristics that are similar to current characteristics of volumes in a second of the common groups of volumes, and the current characteristics of the first volume are not similar to current characteristics of remaining volumes in the first common group, the first volume is reassigned from the first common group to the second common group. Similarly, in response to determining a second volume in the second common group of volumes has current characteristics that are similar to the current characteristics of the remaining volumes in the first common group, and the current characteristics of the second volume are not similar to current characteristics of remaining volumes in the second common group: the second volume is reassigned from the second common group to the first common group.

Dynamically adjusting the volumes that are included in the various common groups based on current characteristics in this way desirably allows for the approaches herein to maintain an accurate and updated understanding of the data that is stored in memory. This allows for ransomware to be identified at the same speed that data I/Os are received and processed by a system. For example, characteristics are continually collected over time and sent from the storage devices to a storage controller which includes AI based models that have been trained to evaluate the characteristics, preferably in real-time. For instance, the AI based models are able to use the characteristics to maintain clusters of similar data while minimizing similarities across clusters, which in turn allows for ransomware monitoring to be performed with much greater efficiency and accuracy than conventionally achievable.

In some implementations, the vectors include characteristics selected from the group consisting of: input/output activity, entropy profile, file system type, and application type. Incorporating different types of characteristics allows for approaches herein to capture a significant amount of relevant information in each of the respective vectors. In turn, this allows for the vectors to be compared in more detail and allows for the clusters of volumes to maintain a desired level of similarity thereacross. This also allows for data volumes to be accurately incorporated regardless of the amount and/or type of details that are available for the respective volumes.

In some implementations, the performing ransomware detection on the common groups of volumes includes: determining average entropy values for the respective common groups of volumes. The respective common groups of volumes include a same or similar number of volumes therein. One or more trained AI based models are further used to evaluate the average entropy values. Moreover, in response to the one or more trained AI based models identifying ransomware in at least one of the common groups of volumes, an output is produced that indicates the at least one common group includes the ransomware.

Again, inspecting combinations of volumes for ransomware rather than the individual data allows approaches herein to significantly reduce the computational overhead consumed while monitoring data for cybersecurity based attacks. Training and using AI based models to evaluate average entropy values in this manner thereby allows approaches herein to reduce the amount of information being processed, and improve throughput of the system as a result.

In another general approach, a computer program product includes: one or more computer-readable storage media. The computer program product also includes program instructions that are stored on the one or more storage media to perform any combination of the foregoing methodologies.

In yet another general approach, a computer system includes: a processor set, and one or more computer-readable storage media. The computer system also includes program instructions that are stored on the one or more storage media to cause the processor set to perform any combination of the foregoing methodologies.

In still another general approach, a data storage system is inspected and data included therein is partitioned into logical volumes. Each of the volumes of data may further be converted into a multi-dimensional vector, the dimensions corresponding to various characteristics of the data in the respective volumes. The multi-dimensional vectors may be evaluated (e.g., in a vector space) and used to identify different groupings of the volumes having at least some of the characteristics that are similar or the same. In other words, the multi-dimensional vectors are used to create groups of similar data volumes. Each of the groups of similar data volumes may thereby be accurately combined (e.g., approximated, averaged, etc.), reducing the computational overhead consumed by monitoring the data for ransomware and/or other cybersecurity based threats. AI based models may thereby monitor the merged volumes for ransomware and/or other cybersecurity based threats at much lower compute consumption rates than conventionally achievable, while also maintaining data security. Moreover, monitoring the data as modifications are made over time allows approaches herein to extend this improved compute consumption across all system operations.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as new ransomware detection code at block 150 for improving the efficiency with which ransomware activity is detected in storage systems. For instance, approaches herein involve identifying similar data in memory and grouping the similar data into subsets that are evaluated independently. Evaluating groups of similar data as opposed to each datapoint individually desirably reduces the computational overhead and latency experienced while performing ransomware detection in a storage system, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output (I/O) ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, the prevalence of computer systems has increased with the advancement of the Internet, and wireless network standards such as Bluetooth and Wi-Fi. Additionally, the adoption and development of smart devices, e.g., such as smartphones, televisions, tablets, and other devices in the IoT has increased as processing power and functionality improve.

Further still, electronic source material has a number of benefits compared to physical documents. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts.

In view of these benefits, an increasing amount of physical material has been digitized. While this digital conversion improves data storage and data accessibility, it also increases the importance of maintaining cybersecurity (e.g., computer security). Again, cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc. Some platforms have been developed to protect computer systems and networks from such attacks. Some of these platforms are running at the operating system level by monitoring file access patterns and/or process activity resulting in additional overhead on data processing systems. Other platforms observe network traffic activity to detect malicious behavior. Computer systems and networks thereby face various types of attacks over time. As threats are consistently evolving, platforms using a combination of different detection capabilities including detection capabilities in storage systems are beneficial.

As the importance of computer systems and networks continue to increase, cybersecurity attacks pose an increasingly significant threat. Cybersecurity has thereby become a significant challenge due to the complexity of computer systems in general, as well as the broad application of computer networks. Ransomware is one such type of cybersecurity attack that has been difficult for conventional products to detect and overcome. For instance, ransomware tries to avoid detection by encrypting and rewriting only parts of a file, so to minimize the footprint of ransomware activity. This also results in the sector I/O observed by a storage device to include a mixture of the ransomware and legitimate operations, e.g., initiated by a user. While attempts have been made to prevent these attacks, conventional products have had difficulty even detecting ransomware attacks as they occur. Detecting ransomware has also become more difficult over time as the amount of data stored in a system continues to increase. For instance, as the number of volumes stored in memory continues to rise into the tens of thousands, the compute overhead associated with simply inspecting memory for ransomware has also increased to an unsustainable level. Accordingly, there exists a need to develop an intelligent system that is able to detect ransomware activity in an efficient manner.

In sharp contrast to these conventional shortcomings, approaches herein are able to detect ransomware activity in storage systems while experiencing less compute overhead by evaluating subsets of sufficiently similar data together. For instance, approaches herein are able to implement certain characteristic collection capabilities in the computational storage devices themselves. These characteristics (also referred to herein as "features") may further be merged into multi-dimensional vectors which may correspond to the respective portions of data in memory from which they were extracted. Approaches herein are thereby able to implement collections of characteristics (e.g., statistics, performance metrics, location information, etc.) at a fine granular level that outlines the data stored across the storage devices themselves.

These characteristics are also desirably collected in parallel and in real-time at high speeds, allowing for approaches herein to maintain an accurate and updated understanding of the data that is stored in memory. This allows for ransomware to be identified at the same speed that data I/Os are received and processed by a system. For example, characteristics are continually collected over time and sent from the storage devices to a storage controller which includes AI based models that have been trained to evaluate the characteristics, preferably in real-time. For instance, the AI based models are able to use the characteristics to maintain groupings of similar data which may be inspected for ransomware much more efficiently than conventionally achievable, e.g., as will be described in further detail below.

Figure 2A:
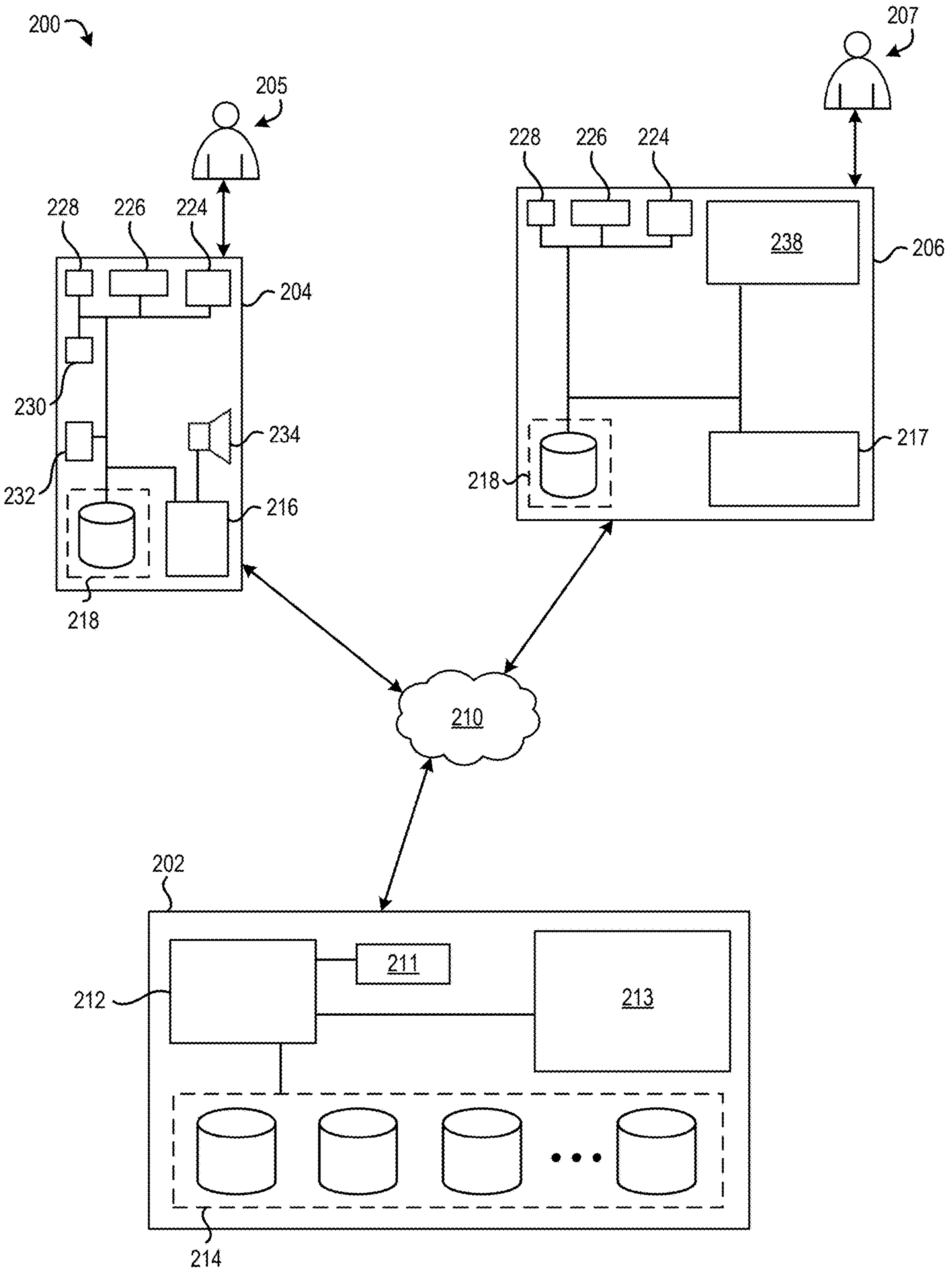
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central data storage location 202 that is connected to a user device 204, and edge node 206 accessible to the user 205 and administrator 207, respectively. The user device 204 and/or edge node 206 may thereby be considered "host locations" that are in communication with the central data storage location 202. The central data storage location 202, user device 204, and edge node 206 are each connected to a network 210, and may thereby be positioned in different geographical locations, in the same data center, or even in the same physical computing system. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, direct attached storage, an internal telephone network, etc. As a result, any desired information, data, commands, instructions, responses, requests, etc. may be sent between user device 204, edge node 206, and/or central data storage location 202, regardless of the amount of separation which exists therebetween, e.g., despite being positioned at different geographical locations. According to some approaches, the central data storage location 202 is a remote cloud server that is connected to (e.g., may be accessed by) user device 204 and/or edge node 206.

However, it should be noted that two or more of the user device 204, edge node 206, and central data storage location 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user," "host," and "administrator" are in no way intended to be limiting either. For instance, while users, hosts, and/or administrators may be described as being individuals in various implementations herein, a user, host, and/or administrator may be an application, an organization, a preset process, etc. The use of "data" and "information" herein are in no way intended to be limiting either, and may include any desired type of details, e.g., depending on the type of operating system implemented on the user device 204, edge node 206, and/or central data storage location 202. In some approaches, host write requests are received at the central data storage location 202 from a host (e.g., user 205 and/or administrator 207) at the user device 204 and/or the edge node 206, respectively. Accordingly, data may be written to memory at the central data storage location 202 in response to receiving host write requests. In some approaches, host write requests received at the central data storage location 202 include read-verify-write operations. Data may thereby be read from and/or written to memory at the central data storage location 202 in response to receiving host write requests, e.g., as will be described in further detail below.

With continued reference to FIG. 2A, the central data storage location 202 includes a large (e.g., robust) processor 212 coupled to a cache 211, an AI module 213, and a data storage array 214 having a relatively high storage capacity. The data storage array 214 may include any desired type of data storage components depending on the approach. Thus, while the data storage array 214 may be illustrated as including hard disk drives, this is in no way intended to be limiting. In other approaches, the array 214 may include solid state drives having volatile and/or non-volatile memory therein, magnetic tape drives, optical storage drives, etc. For instance, referring momentarily to FIG. 2B, the central data storage location 252 is shown as having a data storage module 254 including an array of storage devices 256. The array of storage devices 256 may further include non-volatile memory that is used to store data.

Referring back to FIG. 2A, the AI module 213 may include any desired number and/or type of AI-based models, e.g., such as machine learning models, deep learning models, neural networks, etc. In preferred approaches, the AI module 213 and/or processor 212 are able to train one or more AI based models to inspect data stored in memory (e.g., as a result of performing host requests) and determine whether any cybersecurity related threats are present. The AI based models may be trained over time using characteristics (e.g., features) extracted from stored data in real-time. However, one or more AI based models may be initially trained externally to the data storage location 202 (e.g., before being implemented therein) and AI module 213 may use characteristics gleaned from data written in response to incoming host requests to re-train the AI based model(s) over time. Furthermore, characteristics collected from newly added data (e.g., written in response to incoming host requests) may be inserted into a machine learning model to calculate a classification score that is used to determine whether ransomware and/or other types of cybersecurity attacks are present.

The AI based models are further configured to evaluate subsets (e.g., chunks) of the data that is stored in memory. For instance, similar data may be grouped together and evaluated in parallel. This desirably reduces latency and compute overhead associated with inspecting the data, particularly over time to identify any changes therein. The AI module 213 may thereby be configured to extract characteristics (e.g., features) from data stored in memory, and compare the extracted characteristics to determine data that is sufficiently similar to each other. Depending on the approach, the AI module 213 may collect and aggregate characteristics (e.g., features) such as I/O activity, entropy profiles, file system types, application types, etc., or any other desired details. These AI based models may also continue to be trained (e.g., re-trained) based on how performance changes over time. For instance, AI based models may be automatically re-trained over time based at least in part on outcomes of data requests that are processed at the central data storage location 202 over time. According to an example, received data requests (e.g., signals) may be used to form feature vectors for time intervals, and the feature vectors may thereby be used as inputs for the AI based models (e.g., a Random Forest machine learning algorithm) to train them to detect ransomware activity, e.g., as will be described in further detail below.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some data (e.g., non-sensitive data) may be received from user 205 for storage in data storage array 214 and/or evaluation using AI module 213 at central data storage location 202. The data may be received as a result of the user 205 using one or more applications, software programs, temporary communication connections, etc. running on the user device 204. For example, the user 205 may upload data for storage at the data storage array 214 and evaluation using processor 212 and/or AI module 213 of central data storage location 202. As a result, the data is evaluated and processed.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238. In some approaches, the edge node 206 is a server that may be running any desired type of application (e.g., database, web-server, etc.) which results in I/O requests being sent to the storage system. However, this is in no way intended to be limiting and the edge node 206 may implement any desired type of server architecture that is able to run applications and/or middleware that directly triggers the generation of I/O requests.

As described above with respect to AI module 213, the AI module 238 may include any desired number and/or type of AI-based models. It follows that AI module 238 may implement similar, the same, or different characteristics as AI module 213 in central data storage location 202. AI module 238 may thereby be configured to inspect subsets of similar data stored in memory 218 and detect ransomware therein as a result. As noted above, evaluating groupings of sufficiently similar data significantly improves the operating efficiency of the edge node 206 (e.g., computer) as a whole. Moreover, by adjusting performance based on changes that occur to the data stored in memory, approaches herein are able to maintain the improved efficiency as the system operates over time.

Figure 2B:
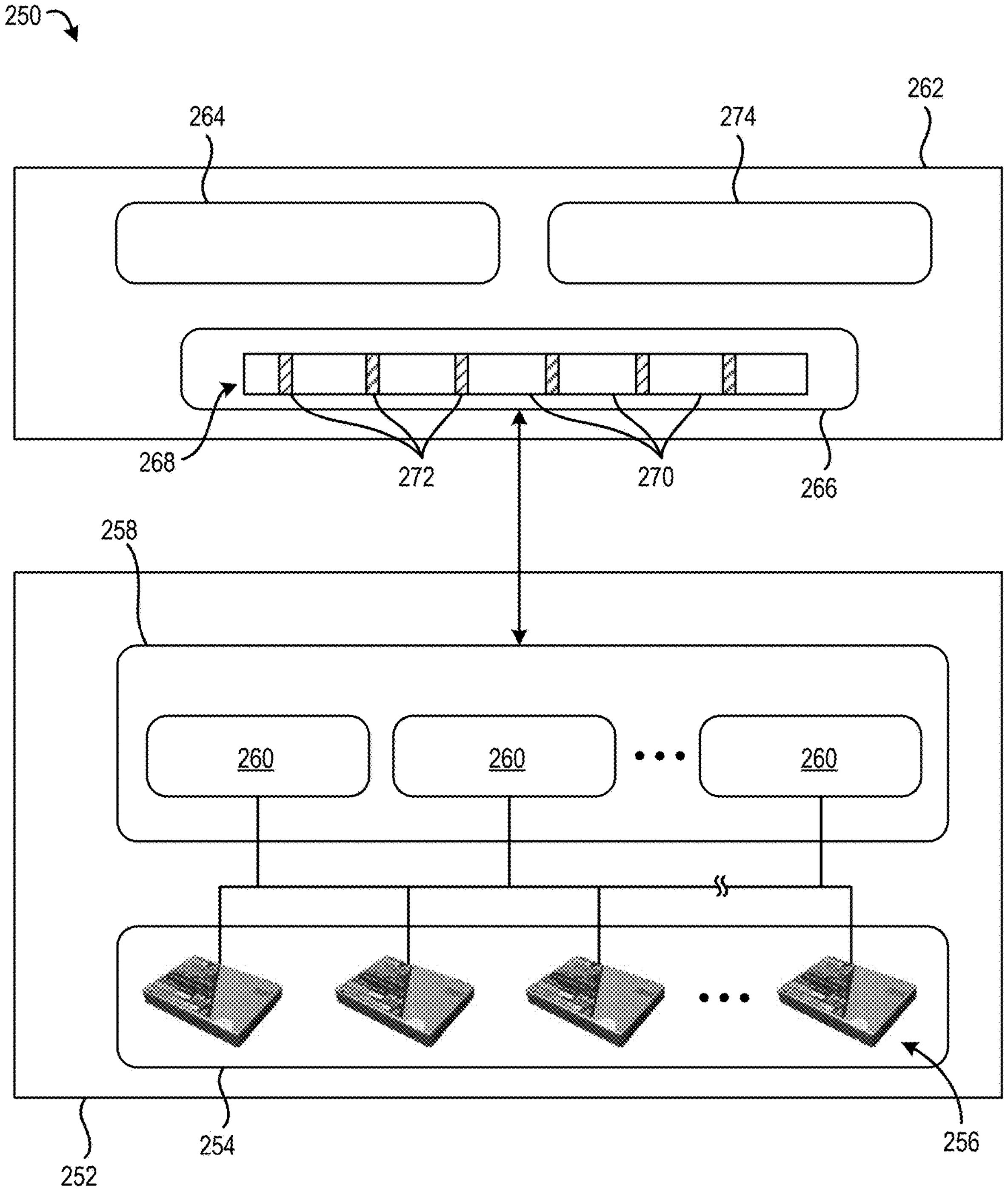
FIG. 2B is a representational view of a distributed system having ransomware detection capabilities, in accordance with one approach.

Referring momentarily now to FIG. 2B, a representational view of how ransomware activity is detected in a storage system 250 is illustrated in accordance with one approach. As an option, the present storage system 250 may be implemented in conjunction with features from any other approach listed herein, such as those described with reference to the other FIGS., e.g., such as FIGS. 1-2A. However, such storage system 250 and others presented herein may be used in various applications and/or in permutations which may or may not be specifically described in the illustrative approaches or implementations listed herein. Further, the storage system 250 presented herein may be used in any desired environment. Thus FIG. 2B (and the other FIGS.) may be deemed to include any possible permutation.

As mentioned above, the storage system 250 includes a central data storage location 252 that is connected to (e.g., in communication with) a user machine 262 (e.g., host location). The user machine 262 includes user applications 264 that are running on an operating system implemented by the user machine 262. As the user applications 264 run, they create files in the file system 266. For instance, file 268 is shown as being present in the file system 266. While a majority of the file 268 includes valid data 270, specific sectors 272 of the file have been impacted by ransomware activity. In other words, specific sectors 272 of the file have been encrypted by ransomware software 274 that has infected the user machine 262. As noted above, the ransomware tries to avoid detection by encrypting and rewriting only parts of a file, so to minimize the footprint of ransomware activity. This also results in the sector I/O observed by a storage device to include a mixture of the ransomware and legitimate data operations. In some situations, ransomware may cause the modified encrypted data parts to be written while the storage system is reading neighboring sectors of the data parts being written as a result of read-modify-write operations.

Again, approaches herein are able to capitalize on this distinct characteristic of ransomware activity by intently inspecting the data stored in memory (e.g., as a result of host and/or relocation write requests) for deviations that indicate the presence of ransomware. Thus, the ransomware activity may be detected as the file 268 is passed to the central data storage location 252 and/or after it has been stored in data storage module 254. For instance, the storage controller 258 may divide a write request stemming from file 268 into a number of sectors. Each of the sectors may be passed to a block storage volume 260 of the storage controller 258 before being implemented in physical memory at the array of storage devices 256. Data stored in the physical memory is further monitored over time and evaluated in chunks, e.g., as will be described in further detail below.

Figure 3A:
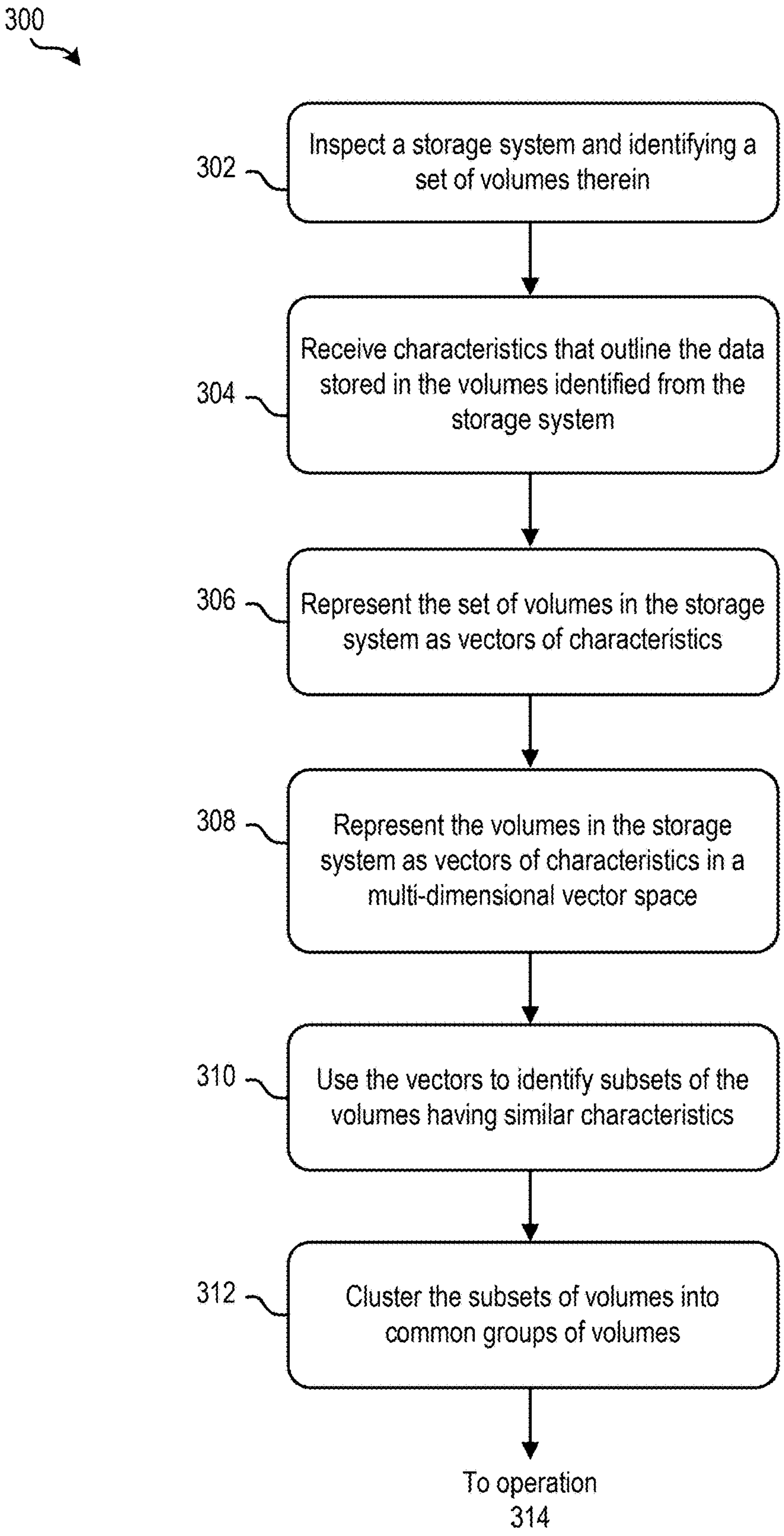
FIG. 3A is a flowchart of a method, in accordance with one approach.
Figure 3A:
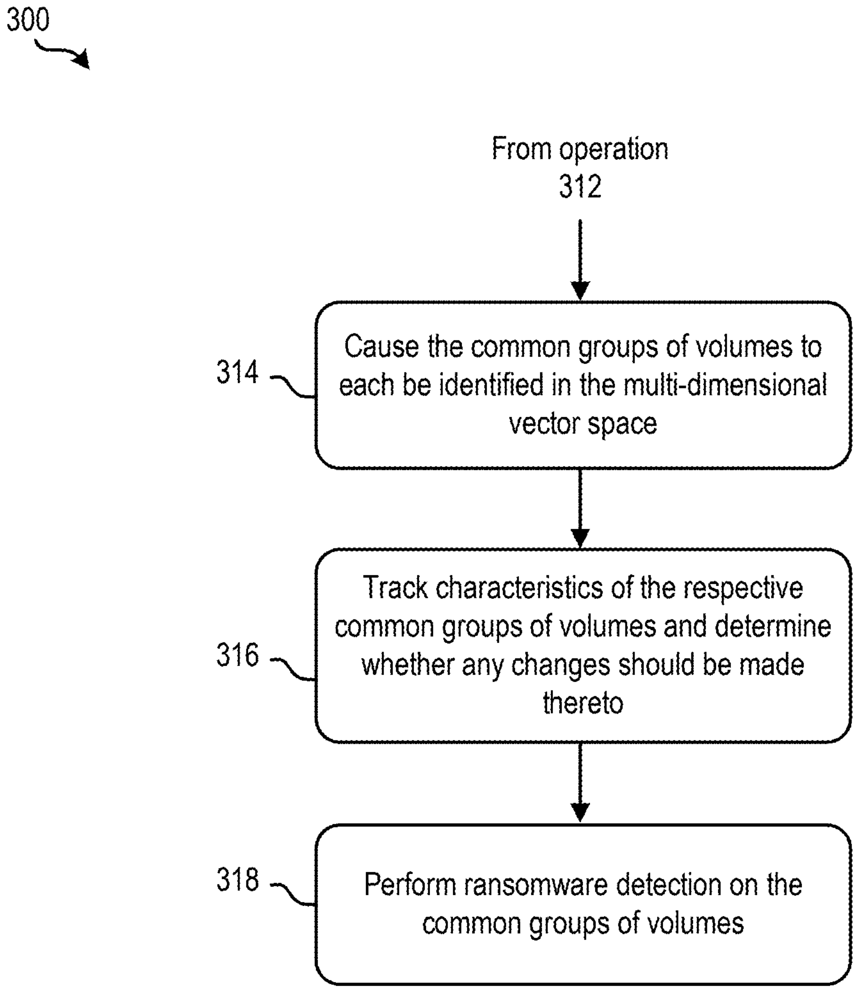

Now referring to FIG. 3A, a flowchart of a method 300 for improving the efficiency with which ransomware activity is detected in storage systems is illustrated in accordance with one approach. For instance, operations in method 300 involve identifying similar data in memory and grouping the similar data into subsets that are evaluated independently. Evaluating groups of similar data as opposed to each datapoint individually desirably reduces the computational overhead and latency experienced while performing ransomware detection in a storage system. Moreover, similar data may be identified based on characteristics (e.g., statistics, performance metrics, location information, etc.) that are collected from the data at a fine granular level. These characteristics are desirably collected in parallel and in real-time at high speeds, allowing for approaches herein to maintain an accurate and updated understanding of the data that is stored in memory. As noted above, this allows for ransomware to be identified at the same speed that data I/Os are received and processed by a system, e.g., as will be described in further detail below.

The method 300 may be performed in accordance with the present invention in any of the environments depicted in FIGS. 1-2B, among others, in various approaches. For instance, one or more operations in method 300 may be performed by components in the central data storage location 202 of FIG. 2A. Moreover, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, in various implementations, the method 300 may be partially or entirely performed by a controller, a processor (e.g., see processor 212 of FIG. 2A), one or more machine learning models (e.g., see machine learning module 213 of FIG. 2A), etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes inspecting a storage system and identifying a set of volumes therein. In other words, operation 302 includes scanning through the data that is currently stored in a storage system and identifying the extents of the data itself. Use of the term "volume(s)" herein may refer to data that is included in a same file, but is in no way intended to be limiting. Rather, data in the storage system may be organized (e.g., partitioned) logically and/or physically as desired.

From operation 302, method 300 advances to operation 304. There, operation 304 includes receiving characteristics that outline the data stored in the volumes identified from the storage system. In other words, characteristics (or "features") which define unique details of the data located in each volume is returned from storage system memory. Scanning the storage system thereby provides an opportunity to collect current (e.g., relevant) details associated with the data in memory. Moreover, by continuing to scan the storage system periodically, in response to receiving instructions from a user, based at least in part on a predetermined condition being met, etc., relevant insight of the data stored in memory may be maintained.

From operation 304, method 300 advances to operation 306. There, operation 306 includes representing the set of volumes in the storage system as vectors of characteristics. In other words, the characteristics received for a given volume of data may be combined and/or transformed into a multi-dimensional vector that is correlated with the respective volume from which the characteristics were extracted. In some approaches, received data requests (e.g., signals) may be used to form feature vectors for time intervals. Approaches herein are thereby able to implement collections of characteristics (e.g., statistics, performance metrics, location information, etc.) at a fine granular level that outlines the data stored across the storage devices themselves.

Depending on the approach, the vectors may include characteristics such as (e.g., selected from the group including) input/output activity, entropy profile, file system type, application type, etc., or any other desired information pertaining to the data in storage. For instance, vectors may include different characteristics that are determined based at least in part on the type of data in a volume, the amount of data in a volume, a size of the overall system, patterns identified by AI based models, inputs received from users, applications currently running in the system, etc. The feature vectors may also be used as inputs for AI based models (e.g., a Random Forest machine learning algorithm) to train them to detect ransomware activity, e.g., as will be described in further detail below.

In some approaches, the vectors are plotted in a multi-dimensional vector space. This allows for characteristics of the different volumes to easily be compared and used to identify data that is sufficiently similar to each other. Accordingly, operation 308 further includes representing the volumes in the storage system as vectors of characteristics in a multi-dimensional vector space. The characteristics vectors may each be plotted as a point on a graph that represents the multi-dimensional vector space. Points in the multi-dimensional vector space that are close to each other may thereby be identified as representing data that is similar to each other. As noted above, evaluating similar data in parallel allows for compute overhead to be significantly reduced. Thus, sufficiently similar volumes are preferably grouped together and simplified before being processed together, e.g., as will soon become apparent.

Proceeding to operation 310, method 300 further includes using the vectors to identify subsets of the volumes having similar characteristics. In some approaches, the multi-dimensional vector space may be inspected to identify volumes that are sufficiently similar. In such approaches, points in the vector space that are separated by a predetermined distance or less may be identified as being sufficiently "similar" to each other. However, determining whether two or more volumes are sufficiently similar to each other may be determined by comparing characteristic values (e.g., readings), referencing predetermined correlations extending between the different characteristics, based at least in part on patterns identified from previous use, etc.

The different dimensions in the vector space may be given equal weight in determining how similar two or more volumes are to each other in some situations. However, an increased or decreased importance may be placed on one or more specific dimensions in the vector space, e.g., depending on one or more external factors. For example, one or more of the multiple dimensions may be identified as being particularly relevant for a given application and given a higher relative weight in determining how similar a pair of volumes are to each other. Similarly, one or more of the dimensions may be identified as not being relevant, e.g., in response to not being updated, based at least in part on past performance, in response to receiving input from a user, by referencing an output generated by an AI based model, etc. A lower (e.g., reduced) weight may thereby be applied to the non-relevant dimensions.

At least some of the volumes that are identified as having sufficiently similar characteristics are preferably added to a same subset or "common group," as referred to herein. Operation 312 thereby includes clustering the subsets of volumes into respective common groups of volumes. In some approaches, volumes that have been clustered into a common group have been assigned to a same logical component. For example, volumes in a common group may be clustered into a same logic erase block. In other approaches, volumes that are clustered into a common group may be assigned to a same physical component (e.g., location). According to another example, volumes in a common group may be clustered (e.g., written) to a same block of memory.

The clustered subsets of sufficiently similar volumes are also preferably indicated in the multi-dimensional vector space. Accordingly, operation 314 includes causing the common groups of volumes to each be identified in the multi-dimensional vector space. The common groups of volumes may be identified in the multi-dimensional vector space differently, e.g., depending on how and/or where the vector space is implemented. For instance, the common groups may be identified using one or more flags, pointers, metadata tags, physical and/or logical memory partitions, etc.

Identifying the different common groups in the multi-dimensional vector space allows for the relative similarities between the various volumes in the storage system to be tracked and compared against "current" characteristics received in real-time as I/O requests are processed, and memory is updated over time. The common groups may thereby maintain dynamic groupings of volumes, each of which includes a respective closest (i.e., most similar) "N" number of volumes therein. Again, grouping a desired number of the most similar volumes into each of the common groups allows for a more accurate approximation of the various data characteristics included in a common group to be made.

In preferred approaches, each of the common groups of volumes include a same number or similar (e.g., within a predetermined tolerance and/or percentage) number of volumes therein. This results in each common group summarizing (e.g., approximating) a same or similar amount of the data in the storage system. However, the relative sizes of the common groups may vary, e.g., to accommodate different numbers of similar volumes. In other words, at least some common groups may be larger to accommodate a greater number of points in the multi-dimensional vector space that fit in a predetermined radius, in comparison to a lesser number of points at a different location in the multi-dimensional vector space that also fit in the predetermined radius. The total number of common groups of volumes may also vary depending on the approach.

It follows that the total number of common groups, and the number of volumes that are included therein, impacts how detailed data in the storage system is evaluated for ransomware and/or other cybersecurity based attacks. The number of common groups and/or volumes included therein also impacts the amount of compute overhead consumed while monitoring for ransomware. For example, a greater number of common groups with fewer volumes of data included therein results in a more detailed evaluation of the data, causing a greater amount of compute overhead. Alternatively, a fewer number of common groups with greater numbers of volumes of data included therein results in a less detailed evaluation of the data, consuming less compute throughput. AI based models herein may thereby be trained to dynamically weigh compute throughput and data security desires to automatically determine a dynamic configuration for the common groups. For instance, AI based models may implement one or more unsupervised clustering algorithms (e.g., k-means clustering), hierarchical clustering processes, etc. Again, inspecting combinations (e.g., merged) of volumes for ransomware rather than the individual data allows approaches herein to significantly reduce the computational overhead consumed while monitoring data for cybersecurity based attacks. This also allows for the AI based models themselves to have a smaller footprint, leading to quicker inference times achieved with less memory running it.

With continued reference to FIG. 3A, method 300 advances from operation 314 to operation 316. There, operation 316 includes tracking characteristics of the respective common groups of volumes and determining whether any changes should be made thereto. In other words, operation 316 involves monitoring current (e.g., dynamic) characteristics of the various volumes over time, and determining whether different groupings of the volumes should be made to maintain a desired level of similarity across the data included therein.

Figure 3B:
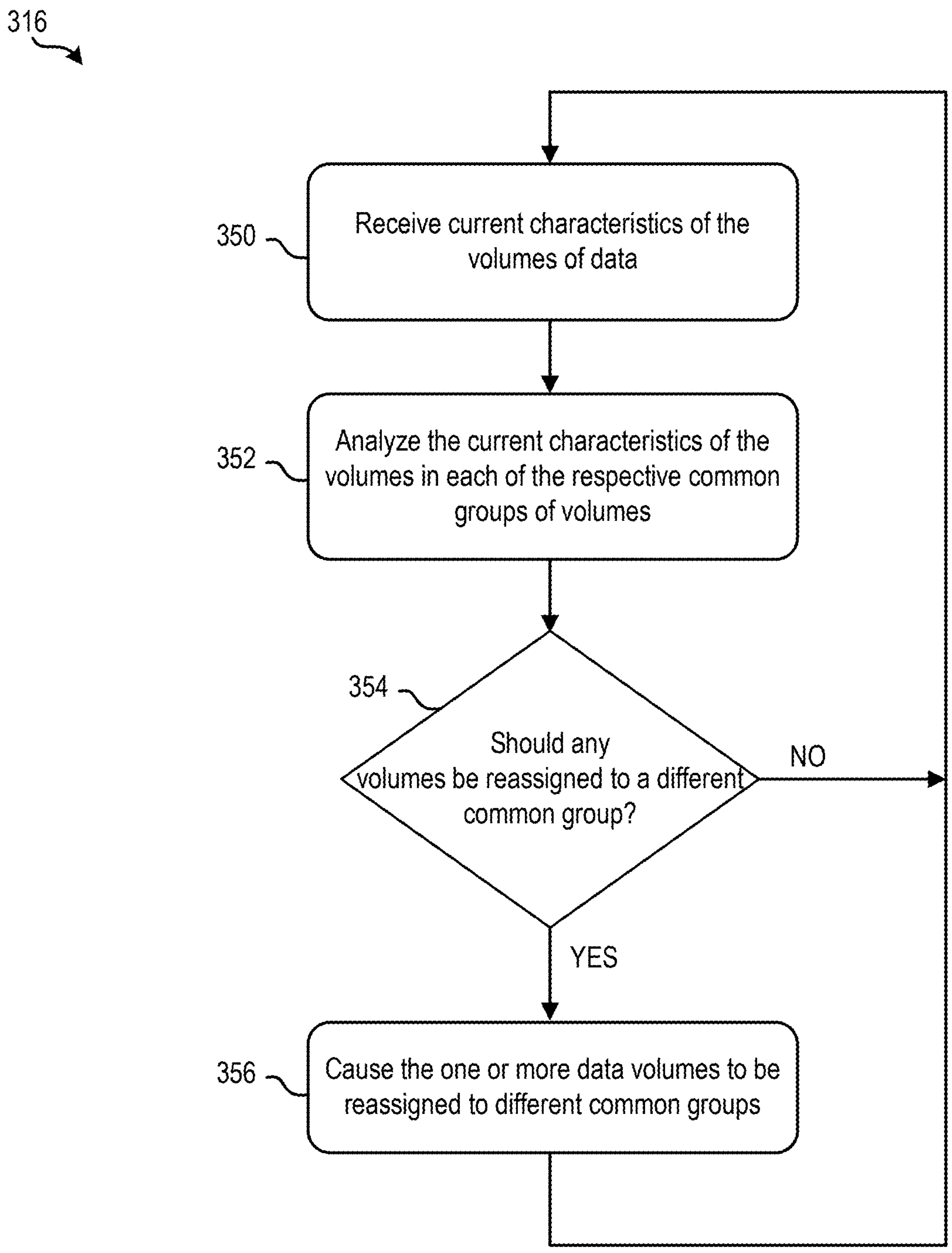
FIG. 3B is a flowchart of sub-processes for one of the operations in the method of FIG. 3A, in accordance with one approach.

Referring momentarily to FIG. 3B, exemplary sub-operations of monitoring current characteristics of volumes over time, and determining whether different groupings of the volumes should be made to maintain a desired level of similarity across the data included therein, are illustrated in accordance with one approach. It follows that one or more of the sub-operations in FIG. 3B may be used to perform operation 316 of FIG. 3A periodically, in response to receiving one or more instructions, in response to a predetermined condition being met, etc. However, it should be noted that the sub-operations of FIG. 3B are illustrated in accordance with one approach which is in no way intended to limit the invention. For instance, sub-operations of FIG. 3B are described in the context of comparing a limited number of common groups to each other, which is in no way intended to be limiting. Rather, all (or any desired portion of) data in the storage system is preferably evaluated and compared to determine relative similarity across the volumes, e.g., as would be appreciated by one skilled in the art after reading the present description.

As shown, FIG. 3B includes receiving current characteristics of the volumes of data. See sub-operation 350. The current characteristics provide real-time (e.g., updated) insight into how the data in a storage system is being used, modified, manipulated, accessed, etc. over time, providing a dynamic ransomware solution when combined with the approaches included herein. Accordingly, sub-operation 352 includes analyzing the current characteristics of the volumes in each of the respective common groups of volumes. Sub-operation 352 thereby involves inspecting each of the common groups and determining whether the volumes clustered therein are still sufficiently similar to each other.

From sub-operation 352, the flowchart advances to sub-operation 354. There, sub-operation 354 includes determining whether one or more of the volumes should be reassigned to a different common group. In other words, sub-operation 354 includes determining whether a volume in the storage system now has a stronger similarity to a different common group (e.g., subset) than the common group the volume is currently assigned to. As noted above, in some approaches it is preferred that each of the common groups include a same or similar number of volumes therein. In such approaches, sub-operation 354 may involve determining whether a volume from different common groups may effectively be exchanged to maintain a consistent size across the common groups.

In other approaches, volumes may simply be reassigned between the common groups to maintain an updated grouping of similar data. For instance, sub-operation 354 may involve determining whether a first volume in a first of the common groups of volumes has current characteristics that are sufficiently similar to the current characteristics of volumes in a second of the common groups of volumes; in addition to determining whether the current characteristics of the first volume are sufficiently similar to current characteristics of remaining volumes in the first common group. Moreover, the first volume may be reassigned from the first common group to the second common group in response to determining the first volume has current characteristics that are similar to current characteristics of volumes in the second common group, and the current characteristics of the first volume are not similar to current characteristics of remaining volumes in the first common group. Similarly, sub-operation 354 may involve determining whether a second volume in the second common group of volumes has current characteristics that are sufficiently similar to the current characteristics of remaining volumes in the first common group; in addition to determining whether the current characteristics of the second volume are sufficiently similar to current characteristics of remaining volumes in the second common group. Moreover, the second volume may be reassigned from the second common group to the first common group in response to determining a second volume has current characteristics that are sufficiently similar to the current characteristics of the remaining volumes in the first common group, and the current characteristics of the second volume are not sufficiently similar to current characteristics of remaining volumes in the second common group. This maximizes the inter-cluster similarity while minimizing similarities across clusters, which in turn allows for ransomware monitoring to be performed with much greater efficiency and accuracy.

With continued reference to FIG. 3B, the flowchart is shown as advancing from sub-operation 354 to sub-operation 356 in response to determining one or more of the data volumes should be reassigned to a different common group. There, sub-operation 356 includes causing the one or more data volumes to be reassigned to different common groups. In other words, sub-operation 356 includes sending one or more instructions (e.g., to a storage controller) that cause the one or more volumes identified in sub-operation 354 to be clustered with a different common group. From sub-operation 356, the flowchart returns to sub-operation 350. The flowchart is also shown as returning from sub-operation 354 to sub-operation 350 in response to determining that reassignment of volumes between the common groups is not appropriate. Current characteristics may thereby continue to be received and evaluated as data in memory is modified over time, and sub-operations in FIG. 3B may be repeated any desired number of times.

Returning now to FIG. 3A, method 300 advances from operation 316 to operation 318. There, operation 318 includes performing ransomware detection on the common groups of volumes. In other words, the common groups of volumes formed and maintained in operation 316 are inspected for ransomware or other nefarious activity. Inspecting for ransomware may be performed differently depending on the approach. For instance, in some approaches all of the common groups are scanned by one or more AI based models for patterns that indicate the presence of ransomware. In other approaches, one or more common groups that include unused volumes may be marked to not be inspected, e.g., to further conserve compute throughput.

Figure 3C:
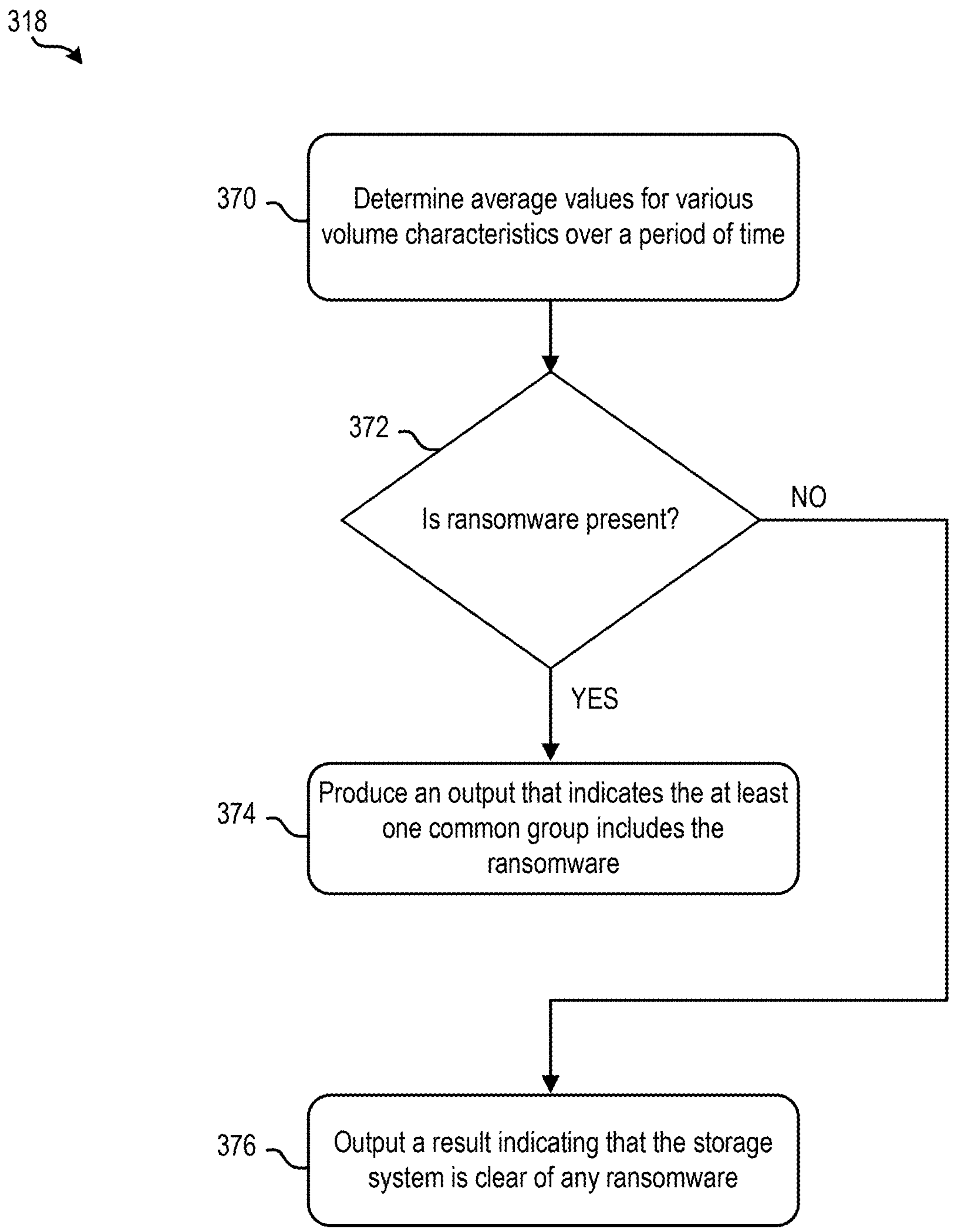
FIG. 3C is a flowchart of sub-processes for one of the operations in the method of FIG. 3A, in accordance with one approach.

Referring to FIG. 3C, exemplary sub-operations of performing ransomware detection on the common groups of volumes, are illustrated in accordance with one approach. It follows that one or more of the sub-operations in FIG. 3C may be used to perform operation 318 of FIG. 3A periodically, in response to receiving one or more instructions, in response to a predetermined condition being met, etc. However, it should be noted that the sub-operations of FIG. 3C are illustrated in accordance with one approach which is in no way intended to limit the invention. For instance, sub-operations of FIG. 3C are described in the context of determining average entropy values for characteristics, which is in no way intended to be limiting. Rather, data volumes clustered in a same common group may be combined (e.g., merged) using any processes that would be apparent to one skilled in the art after reading the present description.

As shown, sub-operation 370 of FIG. 3C includes determining average values for various volume characteristics over a period of time. In other words, sub-operation 370 includes determining average characteristic values over an amount of time for a volume. In some approaches, sub-operation 370 includes determining average entropy values (e.g., entropy read and/or write, entropy variance, entropy re-writes, etc.) for the vectors in each respective common group. Moreover, the period of time over which the characteristics are averaged may be between about 5 and about 20 seconds, more preferably between about 4 and about 15 seconds, more preferably between about 3 and about 10 seconds, still more preferably between about 2 and about 5 seconds, more preferably between about 1 and about 2 seconds, but could be longer or shorter depending on the desired approach.

From sub-operation 370, the flowchart proceeds to sub-operation 372. There, sub-operation 372 includes using one or more trained AI based models to evaluate the average entropy values and determine whether ransomware (or some other malicious threat) is present. As noted above, the AI based models are preferably trained to inspect data stored in memory and determine whether any cybersecurity related threats are present. The AI based models may be trained over time using characteristics (e.g., features) extracted from stored data in real-time. However, one or more AI based models may be initially trained, in addition to using characteristics gleaned from data written in response to incoming host requests to re-train the AI based model(s) over time. Furthermore, characteristics collected from newly added data (e.g., written in response to incoming host requests) may be inserted into a machine learning model to calculate a classification score that is used to determine whether ransomware and/or other types of cybersecurity attacks are present.

The AI based models are further configured to evaluate subsets (e.g., chunks) of the data that is stored in memory. For instance, similar data may be grouped together and evaluated in parallel. This desirably reduces latency and compute overhead associated with inspecting the data, particularly over time to identify any changes therein. The AI based models are thereby preferably configured to extract characteristics (e.g., features) from data stored in memory, and compare the extracted characteristics to determine data that is sufficiently similar to each other.

In response to the one or more trained AI based models identifying ransomware activity in at least one of the common groups of volumes, the flowchart proceeds from sub-operation 372 to sub-operation 374. There, sub-operation 374 includes producing an output that indicates the at least one common group includes the ransomware. In other words, sub-operation 374 includes outputting a warning that identifies the presence of ransomware and may also identify the common group, volume, sub-set of data in a volume, etc., that includes the identified ransomware. In some approaches, sub-operation 374 includes outputting a sample of the ransomware that has been identified, e.g., for external verification. In some approaches, sub-operation 374 includes preventing any additional modifications from being made to any volumes in the common group identified as including the ransomware therein. In some approaches, sub-operation 374 involves taking the storage system offline altogether, e.g., to avoid contamination of other storage systems. However, returning to sub-operation 372, the flowchart proceeds to sub-operation 376 in response to not detecting any ransomware. There, sub-operation 376 includes outputting a result indicating that the storage system is clear of any ransomware (or other malicious activity).

It follows that method 300 is desirably able to detect ransomware activity in storage systems while experiencing less compute overhead by evaluating subsets of sufficiently similar data together. For instance, method 300 is able to implement certain characteristic collection capabilities in the computational storage devices themselves. These characteristics (also referred to herein as "features") may further be merged into multi-dimensional vectors which correspond to the respective portions of data in memory from which they were extracted. Method 300 is thereby able to implement collections of characteristics (e.g., statistics, performance metrics, location information, etc.) at a fine granular level that outlines the data stored across the storage devices themselves.

These characteristics are also desirably collected in parallel and in real-time at high speeds, allowing for approaches herein to maintain an accurate and updated understanding of the data that is stored in memory. This allows for ransomware to be identified at the same speed that data I/Os are received and processed by a system. For example, characteristics are continually collected over time and sent from the storage devices to a storage controller which includes AI based models that have been trained to evaluate the characteristics, preferably in real-time.

It should also be noted that the operations in method 300 are preferably performed automatically in the background without any input from users. Thus, data I/O requests may continue to be received and processed while at least a portion of method 300 is performed. The continued performance of I/O requests causes the data in memory to change over time. Method 300 is thereby preferably able to account for such data changes and continue searching for ransomware while maintaining improved operational efficiency for the underlying system computers.

Approaches herein are able to group volumes in volume-groups to tame latency and complexity of monitoring for cybersecurity based threats. As noted above, each volume (subset of data) in a storage system may be represented by a vector of characteristics, or a sequence of such vectors (e.g., representing time evolution of features). These vectors may thereby be treated as points in multi-dimensional vector space, for every volume. A clustering method of grouping volumes in different groups is also implemented, where volumes in one group are more similar to each other than volumes in different groups. Different methods may be applied which strive to increase inter-group similarity and minimize it across the groups. The features used for clustering may not be the same as those used to do model inference. Clustering may need to be adapted as characteristics change to avoid phenomena like cluster and/or feature drift.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:

representing a set of volumes in a storage system as vectors of characteristics in a multi-dimensional vector space;

using the vectors to identify subsets of the volumes having similar characteristics;

clustering the subsets of volumes into respective common groups of volumes;

causing the common groups of volumes to be identified in the multi-dimensional vector space;

tracking, in the multi-dimensional vector space, the similar characteristics of the respective common groups of volumes; and performing ransomware detection on the common groups of volumes.

2. The method of claim 1, further comprising:

analyzing current characteristics of the volumes in the respective common groups of volumes; and in response to determining a first volume in a first of the common groups of volumes has current characteristics that are similar to current characteristics of volumes in a second of the common groups of volumes, and the current characteristics of the first volume are not similar to current characteristics of remaining volumes in the first common group: reassigning the first volume from the first common group to the second common group.

3. The method of claim 2, further comprising:

in response to determining a second volume in the second common group of volumes has current characteristics that are similar to the current characteristics of the remaining volumes in the first common group, and the current characteristics of the second volume are not similar to current characteristics of remaining volumes in the second common group: reassigning the second volume from the second common group to the first common group.

4. The method of claim 1, wherein the vectors include characteristics selected from the group consisting of: input/output activity, entropy profile, file system type, and application type.

5. The method of claim 1, wherein the performing ransomware detection on the common groups of volumes includes:

determining average entropy values for the respective common groups of volumes; and using one or more trained AI based models to evaluate the average entropy values.

6. The method of claim 5, wherein the performing ransomware detection on the common groups of volumes further includes:

in response to the one or more trained AI based models identifying ransomware in at least one of the common groups of volumes, producing an output that indicates the at least one common group includes the ransomware.

7. The method of claim 1, wherein the respective common groups of volumes include a same number of volumes therein.

8. A computer program product comprising:

one or more computer-readable storage media; and program instructions stored on the one or more storage media to perform operations comprising:

representing a set of volumes in a storage system as vectors of characteristics in a multi-dimensional vector space;

using the vectors to identify subsets of the volumes having similar characteristics;

clustering the subsets of volumes into respective common groups of volumes;

causing the common groups of volumes to be identified in the multi-dimensional vector space;

tracking, in the multi-dimensional vector space, the similar characteristics of the respective common groups of volumes; and performing ransomware detection on the common groups of volumes.

9. The computer program product of claim 8, wherein the operations further comprise:

analyzing current characteristics of the volumes in the respective common groups of volumes; and in response to determining a first volume in a first of the common groups of volumes has current characteristics that are similar to current characteristics of volumes in a second of the common groups of volumes, and the current characteristics of the first volume are not similar to current characteristics of remaining volumes in the first common group: reassigning the first volume from the first common group to the second common group.

10. The computer program product of claim 9, wherein the operations further comprise:

in response to determining a second volume in the second common group of volumes has current characteristics that are similar to the current characteristics of the remaining volumes in the first common group, and the current characteristics of the second volume are not similar to current characteristics of remaining volumes in the second common group: reassigning the second volume from the second common group to the first common group.

11. The computer program product of claim 8, wherein the vectors include characteristics selected from the group consisting of: input/output activity, entropy profile, file system type, and application type.

12. The computer program product of claim 8, wherein the performing ransomware detection on the common groups of volumes includes:

determining average entropy values for the respective common groups of volumes; and using one or more trained AI based models to evaluate the average entropy values.

13. The computer program product of claim 12, wherein the performing ransomware detection on the common groups of volumes further includes:

in response to the one or more trained AI based models identifying ransomware in at least one of the common groups of volumes, producing an output that indicates the at least one common group includes the ransomware.

14. The computer program product of claim 8, wherein the respective common groups of volumes include a same number of volumes therein.

15. A computer system comprising:

a processor set;

one or more computer-readable storage media; and program instructions stored on the one or more storage media to cause the processor set to perform operations comprising:

representing a set of volumes in a storage system as vectors of characteristics in a multi-dimensional vector space;

using the vectors to identify subsets of the volumes having similar characteristics;

clustering the subsets of volumes into respective common groups of volumes;

causing the common groups of volumes to be identified in the multi-dimensional vector space;

tracking, in the multi-dimensional vector space, the similar characteristics of the respective common groups of volumes; and performing ransomware detection on the common groups of volumes.

16. The computer system of claim 15, wherein the operations further comprise:

analyzing current characteristics of the volumes in the respective common groups of volumes;

in response to determining a first volume in a first of the common groups of volumes has current characteristics that are similar to current characteristics of volumes in a second of the common groups of volumes, and the current characteristics of the first volume are not similar to current characteristics of remaining volumes in the first common group: reassigning the first volume from the first common group to the second common group; and in response to determining a second volume in the second common group of volumes has current characteristics that are similar to the current characteristics of the remaining volumes in the first common group, and the current characteristics of the second volume are not similar to current characteristics of remaining volumes in the second common group: reassigning the second volume from the second common group to the first common group.

17. The computer system of claim 15, wherein the vectors include characteristics selected from the group consisting of: input/output activity, entropy profile, file system type, and application type.

18. The computer system of claim 15, wherein the performing ransomware detection on the common groups of volumes includes:

determining average entropy values for the respective common groups of volumes; and using one or more trained AI based models to evaluate the average entropy values.

19. The computer system of claim 18, wherein the performing ransomware detection on the common groups of volumes further includes:

in response to the one or more trained AI based models identifying ransomware in at least one of the common groups of volumes, producing an output that indicates the at least one common group includes the ransomware.

20. The computer system of claim 15, wherein the respective common groups of volumes include a same number of volumes therein.

* * * * *